United States Patent [19]
Carlton

[11] Patent Number: 5,335,105
[45] Date of Patent: Aug. 2, 1994

[54] HIGH SPEED COMMUNICATIONS INTERFACE PROTECTION SYSTEM

[75] Inventor: Stephen C. Carlton, Plano, Tex.

[73] Assignee: Alcatel Network Systems, Inc., Richardson, Tex.

[21] Appl. No.: 867,269

[22] Filed: Apr. 10, 1992

[51] Int. Cl.$^5$ .............................................. H04J 14/08
[52] U.S. Cl. .................... 359/135; 359/158; 370/60.1
[58] Field of Search .................. 370/94.1, 94.2, 110.1, 370/60, 60.1; 359/135, 158

[56] References Cited

U.S. PATENT DOCUMENTS

4,967,405 10/1990 Upp ..................................... 359/135

Primary Examiner—Leslie Pascal
Attorney, Agent, or Firm—Baker & Botts

[57] ABSTRACT

Working DS3/STS interface cards (18, 46) receive DS3 traffic on incoming DS3 communication lines (12, 42). The interface cards (18, 46) are operable to translate the DS3 signals into STS signals, and to "stuff" them into "A" and "B" clock frames provided to them by an "A" formatter (70) and a "B" formatter (74). These clock frames are then used to transmit data to the "A" formatter (70) and the "B" formatter (74). The DS3/STS interface cards (18,46) inspect incoming STS signals on "A" and "B" buses (82, 84) without having to switch to the inspected signal. Formatters 70 and 74 translate the STS data into formatted data, which eventually are transmitted in optical form on respective optical fibers (150, 190) at clock rates which do not have to be the same. Regeneration input and output ports (210, 216, 206, 166) allow the through-communication of telecommunications signals in STS format, obviating the need for down-translation to DS3 format and back-translation to STS format.

8 Claims, 3 Drawing Sheets

HIGH SPEED COMMUNICATIONS INTERFACE PROTECTION SYSTEM

RELATED APPLICATIONS

This application discloses subject matter related to subject matter disclosed in application Ser. No. 07/867,267, filed on Apr. 10, 1992, entitled "Spare Card Connection Circuitry for High-Speed Telecommunications Receivers/Transmitters" and application Ser. No. 07/867,265, filed on Apr. 10, 1992, entitled "Spare Card Connection and Card Monitoring Circuitry for High-Speed Telecommunications Interfaces." Both of the above applications are assigned to the assignee of the present invention. Both of these applications are fully incorporated herein by reference.

TECHNICAL FIELD OF THE INVENTION

This invention relates in general to electro-optical telecommunications interfaces, and more particularly to a high-speed communications interface protection system.

BACKGROUND OF THE INVENTION

Fiber optic telecommunications lines are proliferating because of their enhanced reliability in comparison to electrical circuits and their greatly enhanced bandwidth. Electro-optical telecommunications interfaces have therefore been developed to translate local electrical telecommunications traffic to optical telecommunications traffic of much higher frequencies, and vice versa.

Conventional optical telecommunications systems have their optical fibers arranged in pairs. In a so-called "one for one" operation mode, a pair of "A" fibers are conventionally designated to carry the telecommunications voice and data traffic, and a pair of "B" fibers are designated as the protect/channel access fibers. If there is a failure in the "A" fibers, the voice and data traffic is switched to the "B" fibers.

In most conventional fiber optic telecommunications terminals, each of the fibers is associated with an STS formatter or deformatter. "STS" is a digital electronic telecommunications protocol operating at about 51 MHz. An STS formatter converts a received STS signal into a formatted electronic signal that is ready to be converted into an optical signal. So-called "transmit" optical fibers are associated with such formatters. A deformatter takes a formatted signal resulting from a received optical signal and turns it into an STS signal. So-called "receive" optical fibers are associated with deformatters. Conventional terminals have an "A" formatter, a "B" formatter, an "A" deformatter and a "B" deformatter.

Conventional electrooptical terminals typically also have two sets of DS3/STS interface cards. "DS3" is an analog telecommunications protocol operating at about 41 MHz. The first set of cards is connected to all four formatters and deformatters, such that STS signals may be sent to and received from either the "A" formatter and deformatter, or alternatively the "B" formatter and deformatter. A second set of interface cards is connected to only the "B" formatter and deformatter.

The STS data are "stuffed" into a clock frame and then are transmitted to and from the formatters and deformatters. The clock frame in turn depends on a clock signal. This clock signal conventionally has either of two origins. In one prior art scheme, the "A" formatter has a "master" clock to which a clock generator on the "B" formatter is slaved. STS data are received from the interface cards by the "A" formatter as using an "A" clock frame, while STS data received from the interface cards by the "B" formatter uses a "B" clock frame. This scheme has a drawback in that if the "A" clock generator fails, the "B" clock will also fail temporarily, causing a hit on both "A" and "B" traffic. The problem has been obviated in the past with the employment of expensive "holdover" circuitry in conjunction with the "B" clock generator.

In another prior art scheme, clock generation circuitry is placed on a separate card, which is then used as a central source for all clocking functions. However, a separate clock card is undesirable due to costs associated with having yet another separate component of the terminal. These additional costs are attributable, for example, to increased installation, maintenance and inventory costs. A need therefore exists for clock circuitry which is adapted to be used in electrooptical terminals with both "A" and "B" fibers, but which avoid the problems associated with the above prior art clocking schemes.

Conventionally, each of the DS3/STS interface cards is capable of receiving only one of the "A" STS signal, originating from the "A" deformatter, and the "B" STS signals, originating from the "B" deformatter. A conventional DS3/STS interface card does not have the ability to inspect the quality of that STS signal that it is not currently receiving. In order to compare the quality of the two STS signals, it must look at the current signal, switch to the other signal, look at the other signal, and make a comparison between the "A" and the "B" signal. If it turns out that the "B" signal is worse than the "A" signal, it must switch back again. Every switching event causes a hit to the telecommunications traffic. As they switch between "A" and "B" paths to inspect signal quality, conventional DS3/STS interface cards cause many hits to the traffic that turn out to be unnecessary. A need therefore exists to develop an interface card which will protect the traffic with fewer switching events.

Electrooptical terminals may be used to form "add/-drop multiplexer" nodes, at which DS3 traffic is "added" to a stream of optical traffic and at which some of the optical traffic is "dropped" to the DS3 protocol. These nodes also pass through optical traffic to other electrooptical nodes. Terminals are also commonly configured as portions of unidirectional and bidirectional rings. As so configured, these nodes have both add/drop and passthrough capabilities. In order to "pass through" optical traffic, conventional nodes must translate the optical traffic to STS format, must translate the STS format to DS3 format, must transfer the DS3 signals to other DS3 cards, must translate the DS3 signals to STS signals, and must translate these STS signals to optical signals for retransmission to other nodes. This circuitous retranslation path requires additional DS3/STS interface capability, increases equipment complexity, and provides further opportunities for signal degradation and equipment failure. A need therefore exists for an electrooptical telecommunications node at which the optical/STS/DS3/DS3/STS/optical translation path is not necessary for through-transmission of optical signals.

Conventional formatters receive a plurality of channels of STS information from DS3/STS interface cards, such as 12. Only certain of these channels may be carrying voice or data information at any one time. For example, in a terminal where there are three STS channels transmitted from each of four DS3/STS interface cards, there may be information transmitted on only channels 1, 5, and 10. Conventional formatters and associated optical transmitters merely translate these channels and the remaining 9 empty channels into corresponding optical channels, leaving 9 unused channels interspersed among the used channels. In this example, the channels would merely be translated back into STS at the next node, and possibly routed to DS3/STS interface cards which correspond to the interface cards from which the channels emanated. This results in requiring more multichannel DS3/STS interface cards than would otherwise be needed. A need therefore exists to more efficiently use the optical bandwidth and to avoid the provision of further interface cards to allow for nonuse of some of the interface card receiving channels.

SUMMARY OF THE INVENTION

The present invention satisfies these needs in that it (a) provides an a clocking scheme for independently clocking "A" and "B" traffic without the requirement of additional cards; (b) provides DS3/STS interface cards which may sense STS signal quality without switching between "A" and "B" traffic; (c) allows through-transmission of optical data without down-translation to, and up-translation from, the DS3 format; and (d) allows STS channel compaction.

According to a third aspect of the invention, the "A" and "B" formatters are both provided with on-board clock generators. The clock generator on the "A" formatter generates "A" clock signals and clock frames. The clock generator on the "B" formatter independently generates "B" clock signals and clock frames. These "A" and "B" clock signals and frames are used by the DS3/STS interface cards to transmit data to the "A" and "B" formatters, respectively. In this way, interdependence between the "A" and the "B" clock is avoided and no separate clock generator card is needed.

According to a second aspect of the invention, each of the DS3/STS interface cards has the capability of inspecting the quality of each of the "A" and "B" STS signals that it receives from the deformatters. This is done by providing monitoring circuits at both "A" and "B" inputs of the interface circuit. In this way, the interface card may be operable to switch from the "A" signal to the "B" signal only when the quality of the "A" signal is substantially worse than the quality of the "B" signal.

According to a third aspect of the invention, a telecommunications interface is provided which allows the through-transmission of data in the STS telecommunications protocol, without down-translation to DS3 and up-translation back to STS as is now required. Each formatter in the interface circuit is provided with first and second regeneration input ports, while each deformatter in the interface circuit is provided with a regeneration output port. When such interface circuits are connected back-to-back, with the regeneration input ports of a first interface circuit connected to the regeneration output ports of the second, and vice versa, direct STS communication is made possible. The provision of regeneration input and output ports makes the interface circuit of the invention particularly adaptable to add/drop nodes and ring networks, wherein STS data can be transmitted through to other optical fibers, while some STS traffic can be dropped to the DS3 side or added from the DS3 side.

According to a fourth aspect of the invention, each of the formatters and deformatters of the invention is provided with an STS cross point matrix. Each formatter includes a cross point matrix coupled to the STS input of the formatter and operable to shift certain STS channels over to other STS channels. In this way, used channels interspersed among unused channels may be compacted into one or more groups of channels which correspond to groups of channels processed by particular DS3/STS interface cards. Each group of channels is then eventually transmitted to one such card. This allows a saving in the number of interface cards provided at each electrooptical node.

The present invention enhances telecommunications reliability. When converging different data streams, a minimum number of pointer processors are necessary to synchronize the signals with each other before optical transmission. Particular optical fiber spans are easily protectable by shunting "A" traffic to "B" traffic at one node, and then shunting such traffic back to an "A" fiber at a subsequent node. The regeneration input and output connections obviate the need for further, expensive DS3/STS interface cards. The independence of the "A" and "B" clocks means that rings emanating from a node can operate at least slightly different frequencies. This means that the clock generating circuitry does not have to be closely matched, obviating the need for pointer processors and causing considerable monetary savings. The invention provides a high speed protection system of enhanced adaptability to ring architectures.

BRIEF DESCRIPTION OF THE DRAWINGS

Further aspects of the invention and their advantages will be discerned from the following detailed description in conjunction with the drawings in which like characters identify like components, and in which.

DETAILED DESCRIPTION OF THE INVENTION TERMINAL CIRCUIT

Figure 1:
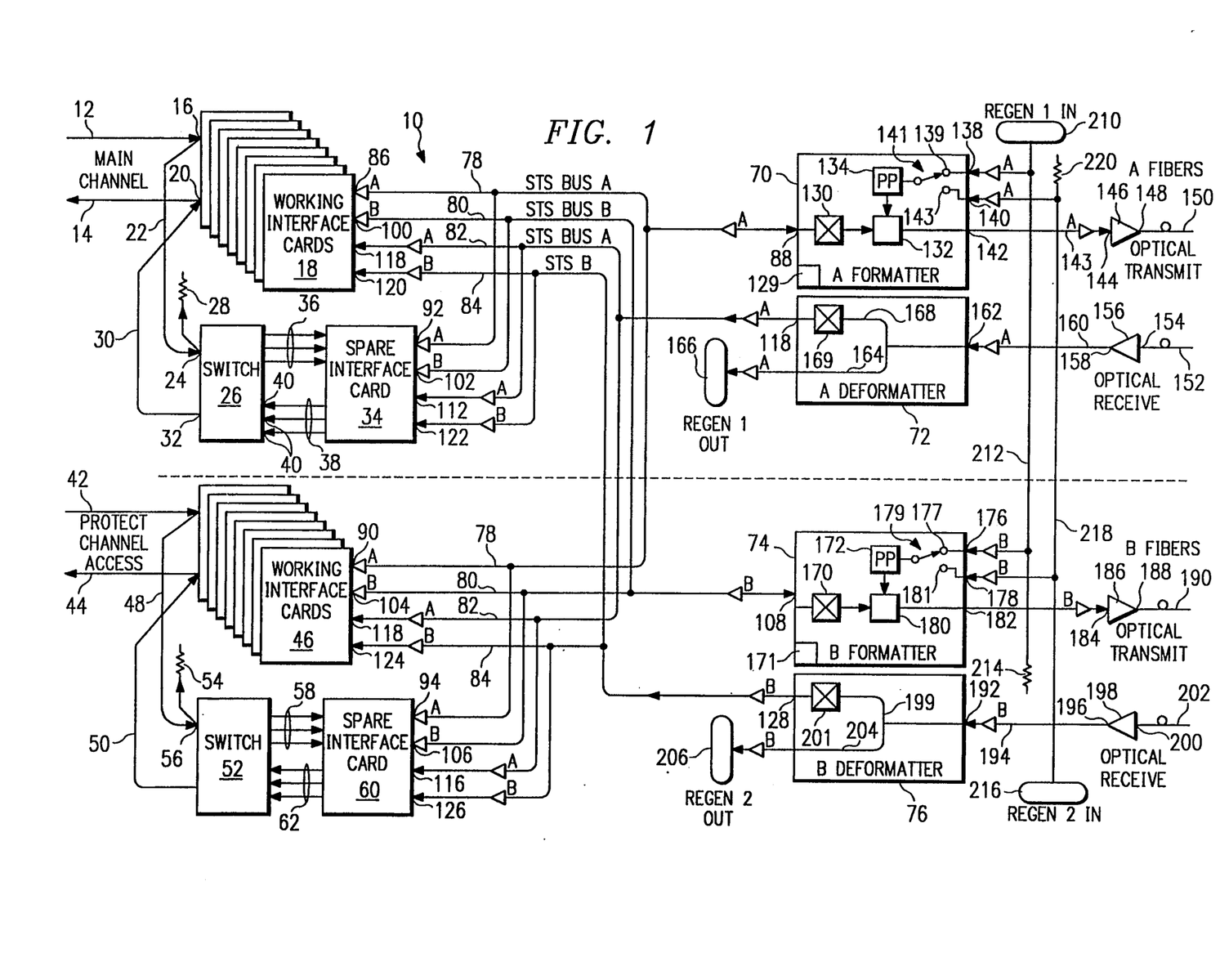
FIG. 1 is a schematic electrical diagram of a DS3/STS/optical telecommunications interface according to the invention.

Referring first to FIG. 1, an electro-optical telecommunications interface terminal is indicated generally at 10. As will be hereinafter explained, telecommunications interface terminal 10 has both low-speed and high-speed protection.

A preferably 24-channel, 75-Ohm DS3 incoming cable is shown at 12. A similar outgoing DS3 cable is indicated at 14. DS3 cables 12 and 14 constitute a main channel for DS3 telecommunications signals.

The incoming DS3 line 12 is connected to a plurality of DS3 input ports 16 on a plurality of working interface cards 18. In a preferred embodiment, there are up to eight such working interface cards 18, with three DS3 channels per card. Output ports of the working interface cards 18, indicated schematically at 20, are connected to respective channels of the DS3 output line 14.

A 24-channel, 75-Ohm line 22 is connected between the input port 16 of the working interface cards 18 and a plurality of input ports 24 of a switch card 26. The input ports 24 of the switch card 26 are connected to a resistive termination block 28. There is a slight degradation of the signal on line 22 as it passed through switch 26 and onto spare 34 in order that the quality of the signal received at the spare interface card (described below) is no better than the signal quality received at each of the working interface cards 18. This ensures that the system will not switch to protect a DS3 card on which there is no malfunction.

A 75-Ohm line 30 is connected between the output ports 20 of the working interface cards 18 and respective output ports 32 of the switch card 26.

The switch card 26 is operable to connect three of the twenty-four channels in line 22 to three DS3 input ports of a spare interface card 34 via a three-channel line 36. The spare interface card 34 has a plurality of output ports which are connected via a three-channel line 38 to spare card ports 40 of the switch card 26.

Working interface cards 18 each have three DS3 receivers and three DS3 transmitters. Along with a plurality of tests performed by each of the interface cards 18, the DS3 signals received by the card are translated into STS (synchronous transport signal) protocol. Likewise, STS signals received on the working interface card are translated into the DS3 protocol for output on the main channel output line 14. For further details of the construction of the working interface cards 18, the switch card 26 and the spare interface card 34, reference is made to FIGS. 2 and 3 below and to application Ser. No. 07/867,267, filed on Apr. 10, 1992, and application Ser. No. 07/867,265, filed on Apr. 10, 1992. Both of these applications are assigned to the assignee of this application, and both of these applications are fully incorporated herein by reference.

The spare interface card 34 has similar components and functions. It is capable of translating three DS3 signals received on lines 36 into an STS protocol or format, and also of translating incoming STS signals for output as DS3 signals on lines 38. The spare interface card 34 is provided to protect any one of the working interface cards 18. Further, it may be used to monitor the operation of the working interface cards 18 and the switch card 26, as more fully described in application Serial No. 07/867,265.

The DS3/STS interface circuitry described immediately above for the main DS3 channel lines 12 and 14 is duplicated for a protect channel access pair of DS3 external lines, including an incoming DS3 line 42 and an outgoing DS3 line 44. The various components of the DS3/STS interface for the protect channel access lines 42 and 44 are identical in all respects to the components described above, including up to eight working DS3/STS interface cards 46 and lines 48 and 50. Line 48 connects respective input ports of the working interface cards 46 to a switch card 52, and Line 50 connects output ports of the switch card 52 to output ports of the working interface cards 46. A resistive termination block 54 is connected to the input ports 56 of the switch card 52. A three-channel line 58 connects switch card 52 to input ports of a spare interface card 60, and a three-channel line 62 connects DS3 output ports of the spare interface card 60 to the switch card 52.

Interface circuitry 10 is provided with an "A" formatter 70, an "A" deformatter circuit 72, a "B" formatter 74 and a "B" deformatter 76. Formatters and deformatters 70-76 are connected to the main and protect working interface cards 18 and 46, as well as to the spare interface cards 34 and 60, by four buses 78, 80, 82 and 84. An STS "A" bus 78 is connected to an STS output port 86 on each of the working interface cards 18, an STS data input port 88 of the "A" formatter 70, an STS output port 90 on each of the working interface cards 46, an STS output port 92 of the spare interface card 34, and an STS output port 94 of the spare interface card 60. On each of the buses 78-84, the black arrows indicate the direction of data transmission. Open arrows marked with an "A" indicate the direction of travel of "A" clock signals and clock frames. Open arrows marked with "B" indicate the direction of travel of "B" clock signals and clock frames. The transmission and reception of the clock signals, clock frames and data will be explained hereinafter.

Bus 80 is an STS "B" bus, and is connected among a plurality of STS output ports 100 of the working interface cards 18, an STS output port 102 of the spare interface card 34, a plurality of STS output ports 104 of the working interface cards 46, an STS output port 106 of the spare interface card 60, and an STS input port 108 of the "B" formatter 74. The bus 82 is an STS bus for "A" traffic, and is connected among a plurality of STS input ports 110 of the working interface cards 18, an STS input port 112 of the spare interface card 34, a plurality of STS input ports 114 of the working interface cards 46, an STS input port 116 of the spare interface card 60, and an STS output port 118 of the "A" deformatter 72. Bus 84 is an STS bus for carrying "B" traffic and is connected among a plurality of STS input ports 120 of the working interface cards 18, an STS input port 122 of the spare interface card 34, a plurality of STS input ports 124 of the working interface cards 46, an STS input port 126 of the spare interface card 60, and an STS output port 128 of the "B" deformatter 76. Each of the buses 78-84 are capable of carrying at least twenty-seven channels of information apiece; three of these channels are spares.

The STS "A" bus 78 transmits STS signals from the interface cards 18, 34, 46 and 60 to the "A" formatter 70. "A" clock signals and clock frames, generated by the formatter 70 as will be hereinafter explained, are transmitted from the formatter 70 on the bus 78 to the interface cards 18, 34, 46 and 60. The STS "B" bus 80 is used to transmit STS data from the interface cards 18, 34, 46 and 60 to the "B" formatter 74. "B" clock signals and clock frames are transmitted on the bus 80 from the "B" formatter 74 to the DS3/STS interface cards 18, 34, 46 and 60. The "A" bus 82 is used to transmit both STS data and "A" clock signals and clock frames from the "A" deformatter 72 to the DS3/STS interface cards 18, 34, 46 and 60. Finally, the "B" STS bus 84 is used to transmit STS data and "B" clock signals and clock frames from the "B" deformatter 76 to each of the cards 18, 34, 46 and 60. It will be noticed that each of the interface cards 18, 34, 46 and 60 transmit and receive STS data to and from both the "A" formatter 70 and "A" deformatter 72 and the "B" formatter 74 and the "B" deformatter 76. In prior art structures, the protect channel access cards 46 and 60 were only connected to the "B" buses 80 and 84.

The "A" formatter 70 has an "A" clock generator 129 which is responsible for generating "A" clock signals. Circuitry (not shown) on "A" formatter 70 uses the "A" clock to generate an "A" clock frame in a manner known in the art. The "A" clock and "A" clock frame are periodically output on bus 80.

The "A" formatter 70 includes a cross point matrix unit 130 which receives incoming STS data from the interface cards 18, 34, 46 and 60. The output of cross point matrix 130 is connected to a formatting circuit 132. Formatting circuit 132 is also connected to a pointer processor unit 134. A first regeneration input port 138 of the "A" formatter 70 is connected to a terminal 139 of a switch 141, while a second regeneration input port 140 of the "A" formatter 70 is connected to a terminal 143 of the switch 141. Switch 141 selects between the first and second regeneration input ports 138 and 140. Formatting circuit 132 is connected to a formatted data output port 142, which is connected via a line 143 to a formatted data input port 144 of an "A" optical transmitter 146. Optical transmitter 146 converts the formatted data appearing at its input 144 to an approximately 1.2 Gigabit optical signal on its optical output 148, which is connected to an "A" optical transmit fiber 150.

An "A" optical receive fiber 152 is connected to an optical input 154 of an optical receiver 156. The optical receiver 156 is operable to translate a 1.2 Gigabit optical signal received on its optical input 154 into a formatted signal for output at its electrical signal output port 158. Output port 158 is connected by a line 160 to a formatted data input port 162 of the "A" deformatter 72.

The "A" deformatter 72 is capable of deformatting the incoming signal at 162 into a plurality of STS signals by standard circuitry (not shown) that is known in the art. All of the STS channels are sent on a branch 164 to a first regeneration output port 166. Selected ones of the STS channels are sent to a branch 168 through a cross-point matrix 169 to the STS output port 118.

The "B" formatter 74 is basically a duplicate of the "A" formatter 70. The "B" formatter 74 has a "B" clock generator 171 which generates "B" clock signals. While the "A" clock and "B" clock are nominally at the same frequency, they are independent of each other. The architecture of the system permits completely independent "A" and "B" clocks. The "A" clock generator 129 and the "B" clock generator 171 do not have to be linked or closely matched, resulting in less expense.

"B" formatter 74 also includes a cross-connect unit 170, a pointer processor 172, and a first regeneration input port 176. First regeneration input port 176 is connected to a terminal 177 of a switch 179. Switch 179 is connected to the pointer processor 172. A second regeneration input port 178 is connected to terminal 181 of switch 179. A formatting circuit 180 has inputs connected to the pointer processor 172 and to the cross-connect 170, and is connected to an output 182 for transmitting a data stream of formatted signals to an input 184 of a "B" optical transmitter 186. The "B" optical transmitter 186 is operable to transform the formatted data appearing at its input 184 into a 2.1 Gigabit optical signal, which is output at its optical output 188 onto a "B" transmit optical fiber 190.

The "B" deformatter 76 is basically a duplicate of the "A" deformatter 72. A deformatter data input port 192 of "B" deformatter 76 receives data on line 194 from an output 196 of a "B" optical receiver 198. An optical input 200 of the optical receiver 198 is connected to an optical fiber 202 for receiving a 1.2 Gigabit optical signal thereon. The optical receiver 198 is operable to translate the optical signal into a formatted electronic data stream, and pass it on line 194 to the formatted data input 192. The "B" deformatter 76 contains circuitry that is known in the art (not shown) for deformatting the input signal 192 into a 24-channel STS signal. The "B" deformatter has a branch 199 connected to the input of a cross-point matrix 201. Deformatter 76 transmits all of the received channels in the STS format to a second regeneration output port 206. Deformatter 76 also transmits selected ones of the received channels through the cross-point matrix 201 to the "B" bus 84.

A first regeneration input 210 is connected by a line 212 to first regeneration input ports 138 and 176, respectively, of "A" and "B" formatters 70 and 74. A resistive termination 214 at the end of line 212 is used to provide a non-reflecting termination for the STS signals carried on the first regeneration line 212. A second regeneration input 216 is connected by a line 218 to the second regeneration input port 140 of the "A" formatter 70 and the second regeneration input port 178 of the "B" formatter 74. A resistive termination 220 is connected to an end of the line 218 opposite from input 216, and has an impedance which matches the impedance characteristic of the line 218.

INTERFACE CARDS

Figure 2:
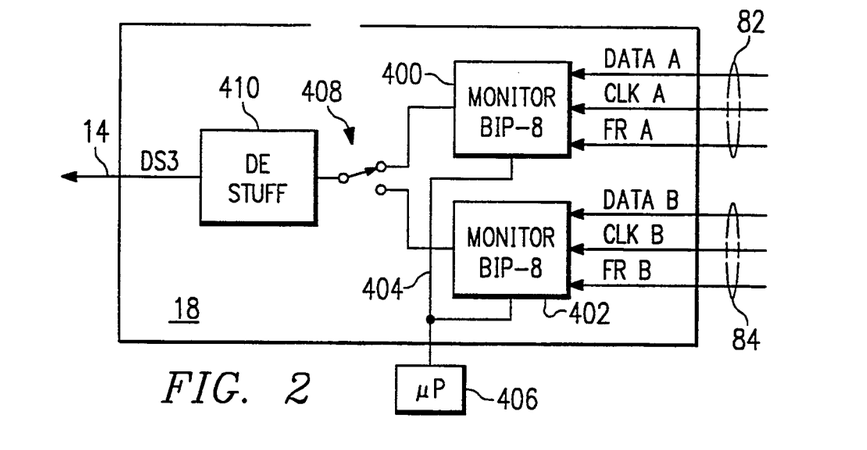
FIG. 2 is a more detailed electrical schematic diagram of the STS receiving side of one of the working interface cards shown in FIG. 1.
Figure 3:
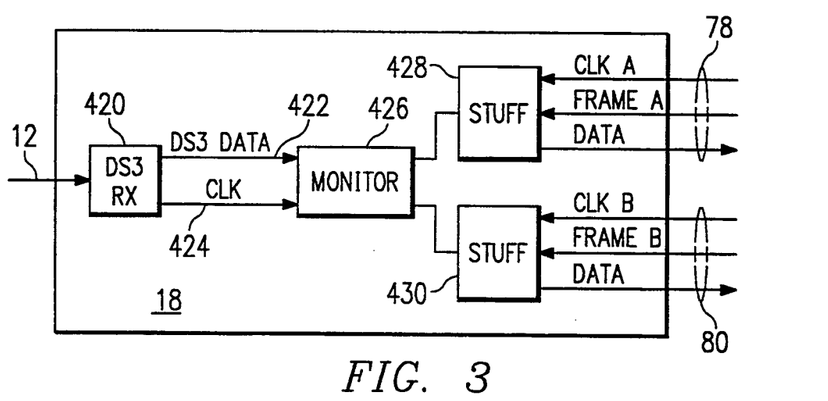
FIG. 3 is a more detailed electrical schematic diagram of the STS transmitting side of one of the working interface cards shown in FIG. 1.

FIG. 2 is a more detailed electrical schematic diagram of one of the DS3/STS interface cards 18 shown in FIG. 1. FIG. 2 shows circuitry on card 18 concerned with the reception of STS signals on buses 82 and 84. STS signal transmission circuitry on card 18 is shown in FIG. 3. For clarity, only one of the three channel circuits resident on card 18 is depicted.

Bus 82 inputs "A" data, the "A" clock and the "A" clock frame to a BIP-8 monitor 400. This monitor looks at the quality of the "A" data. The "A" data includes a "BIP-8" byte that is created, prior to transmission of the "A" data, by (1) summing the contents of each byte to determine if the sum is even or odd, resulting in an "0" or "1", and (2) assembling the bits thus created into the "BIP-8" byte. The monitor 400 performs this same calculation on the received data and compares the results with the received BIP-8 byte. If there is a match the data are considered good; if there is a variation with respect to one or more of the BIP-8 bits, the signal is considered degraded. The details of BIP-8 monitor 400 are known in the art.

BUS 84 inputs "B" data, the "B" clock and the "B" clock frame to a second BIP-8 monitor 402, similar in its construction to monitor 400. The monitor 402 inspects the quality of the "B" data in a manner similar to the inspection of the "A" data done by monitor 400. Monitors 400 and 402 are linked by path 404 to a microprocessor 406. The microprocessor 406 compares the data qualities reported by monitors 400 and 402. In the "1+1" mode, the microprocessor 406 selects either the "A" data or the "B" data based on their quality, and controls a switch 408 to create a data path from the selected monitor 400 or 402 to a de-stuff circuit 410. De-stuff circuit 410, whose details are known in the art, removes the data which had been "stuffed" into a respective clock frame and translates the data to DS3 format. Card 18 outputs an analog DS3 signal based on the selected STS signal.

Card 18 confers a technical advantage over conventional interface cards in that the quality of the "A" and "B" signals may be monitored without operating switch 408. This eliminates the unneeded switching events in conventional interface circuits wherein the circuit had to switch to the "B" bus to inspect the "B" data quality, and then switch back to the "A" bus when it was determined that the "B" data quality was no better than that of the "A" data. According to the invention, switch 408 is operated only after signal quality has been determined and compared. The reduced number of switching events means a reduced number of hits to the traffic.

FIG. 3 is a more detailed electrical schematic diagram of the "transmit" side of the circuitry on the card 18. Once again, circuitry for only one of three channels is shown. A DS3 receiver 420 takes an analog signal from line 12 and converts it to a digital DS3 signal, which is output on line 422. A clock is also recovered from the input and is output on line 424. Lines 422 and 424 are input into a DS3 monitoring circuit 426. Monitor 426 in turn transmits the digital DS3 signal to the inputs of each of two stuffing circuits 428 and 430. The internal details of monitor 426 and stuffing circuits 428 and 430 are known in the art.

Stuffing circuit 428 receives the "A" clock and frame on bus 78 from formatter 70 (see FIG. 1). It uses the received "A" clock frame and "stuffs" the data to be transmitted into it, creating a corresponding "A" STS signal. The "stuffed" STS data are then transmitted on bus 78 to the formatter 70. Stuffing circuit 430 receives the "B" clock and frame on bus 80 from "B" formatter 74 (see FIG. 1). It uses the received "B" clock frame in stuffing the data into it, creating a "B" STS signal from the same DS3 data used to create the "A" STS signal. In this way, the same card may (in a "1+1" mode) originate two STS signals having identical data content but synchronized to independent clocks.

OPERATION OF TERMINAL CIRCUIT

The terminal circuit 10 as shown in FIG. 1 is operable in "1:1, 1+1 and unprotected modes, and is operable to confer high speed protection on the STS signals. The terminal circuit 10, as connected with a like circuit, is also operable in unidirectional ring, bidirectional ring and add/drop modes, as will be discussed in conjunction with FIGS. 4 and 5.

In operation, the "A" formatter 70 generates an approximately 51-Megahertz "A" clock signal by its clock generator 129. The "B" formatter 74 uses its clock generator 171 to generate a "B" clock signal in a like manner. It is an important aspect of the invention that the "A" clock and the "B" clock do not have to be synchronized. This allows the "A" clock and the "B" clock to have a greater frequency variation than would otherwise be permitted. Clock generating circuits having a wider tolerance from their nominal frequency are significantly less expensive than ones that are more closely matched.

For the discussion hereafter, it is assumed that all interface cards 18 and 46 are operational, and that the spare interface cards 34 and 60 are performing DS3 monitoring functions. Data are transmitted from the interface cards 18 and 46 to the "A" and "B" formatters 70 and 74.

If the DS3 channels 12 and 14 are functional, the interface cards 46 for the protect channel access DS3 lines 42 and 44 will not be transmitting voice and communications data in a "1+1" mode. In this instance, only the main working interface cards 18 will be transmitting data back to the "A" and "B" formatters 70 and 74.

The STS signals arriving at port 88 of the "A" formatter 70 are passed to the cross-point matrix 130, in which appropriate cross-connections are made to lines connecting to the formatting circuit 132. Cross-connect 130 is used to "compact" the STS channels into a smaller bandwidth. For example, data may be only received on Channels 1, 5 and 9, which originate on different DS3 cards 18. Channels 2 and 3 on the first card, 4 and 6 on the second card and 7 and 8 on a third card may be empty. In this instance, cross-point matrix 130 is operable to compact channels 1, 5 and 9 to (e.g.) channels 1, 2 and 3 on the outputs of the matrix 130, thereby making six adjacent STS channels available for through-transmission of other data.

The formatting circuit 132 is operable to select some, none, or all of the twenty-four channels received from cross-point matrix 130, and to format this signal into an interleaved, formatted signal output on the output port 142. The details of formatting circuits 132 and 180, which also include performing a multiplexing function, are conventional. The formatting circuit 132 is also connected to the pointer processor 134. Pointer processor 134 receives an STS signal from a terminal of a switch 141. Switch 141 is operable to select one of the two terminals 139 and 143, such that STS data from the first regeneration input port 138 or STS data from the second regeneration input port 140 is selected for input into the pointer processor 134. The pointer processor 134 is operable to adjust the frequency of the STS signal it receives to match the frequency of the "A" clock 129 on formatter 70. In the (usual) instance where only some of the twenty-four channels of bus 78 are used to transmit data from the DS3/STS interface cards 18 the remaining channels will be available for data from the pointer processor 134. The "A" formatter 70 is able to select signals from the first regeneration input port or the second regeneration input port, but not both. Thus, a combined formatted data stream may include both STS signals that are derived from an STS source exterior to the terminal circuit 10, together with "added" STS signals which have been translated up from DS3 signals.

The "A" formatter 70 is also operable to transmit a clock signal onto line 143 to the input 144 of the optical transmitter 146, together with the formatted data. The optical transmitter 146 processes this clock signal to derive a 1.2 Gigabit clock pulse, which is twenty-four times as fast as the approximately 51-Megahertz clock signal that is preferably used by the "A" formatter 70. In this way, the "A" clock can be passed to another node.

The "B" formatter operates in a manner similar to the "A" formatter 70. The "B" formatter is operable to combine STS signals appearing at its input port 108 with signals from a selected one of the first and second regeneration input lines 212 and 218. The pointer processor 172 is operable to adjust the frequency of STS data appearing on one of lines 212 and 218 to match the frequency of the "B" clock generated by clock circuitry 171 on the "B" formatter 74.

Because the working interface cards 18 transmit STS data on both the "A" bus 78 and the "B" bus 80, it is possible to transmit optical data in a "one plus one" format, with data being transmitted on "A" fiber 150 and identical data being transmitted on "B" fiber 190.

Nonetheless, these optical data will be synchronized to different clocks. The scheme according to the invention avoids additional pointer processor circuitry that adds or deletes bytes from the signals in order to match them; pointer processors are only necessary at points 134 and 172.

The working interface cards 18 are operable to select incoming STS data on buses 82 or 84. Reception of "A" STS data on bus 82 and retransmission of same in DS3 format is the default condition. However, if alarms are contained within the "A" clock frame received on the STS bus 82, the interface cards 18 are operable to select STS data appearing on the "B" bus 84 for retransmission on the DS3 output line 14. As such alarms are conventional, they are not further described here.

An optical signal is received by the "A" optical receiver 156, and translated into formatted data which appears on the line 160. A 1.2 Gigabit "A" clock signal is divided down into a 51-Megahertz "A" clock signal and is transmitted together with the formatted data to the input 162 of the "A" deformatter 72. As operating in an add/drop mode, the "A" deformatter 72 is operable to retransmit all of the twenty-four channels on the first regeneration output 166, while "dropping" selected ones of the twenty-four channels onto the STS output port 118 after being routed by cross-point matrix 169. The "dropped" STS signals, as already stuffed into "A" clock frames, are transmitted together with an "A" clock signal to the interface card 18. The "B" deformatter 76 operates in a similar manner, and is capable of sending all STS "B" channels to second regeneration output port 206 while at the same time "dropping" selected STS "B" channels to its STS output port 128.

The telecommunications terminal circuit 10 shown in FIG. 1 may be operated in a no-protection, 48-channel mode as follows. Interface cards 18 are operated to transmit their STS data on the STS "A" bus 78 to the "A" formatter 70. Working interface cards 46 are operable to transmit their STS data on "B" bus 80 to the "B" formatter 74. Between one and twenty-four channels of STS data may be so transmitted to the "A" formatter 70, and another one to twenty-four channels transmitted to the "B" formatter 74. If the terminal circuit 10 is operating in an add/drop mode and depending on how many channels are left over, the first regeneration input 210 will supply regenerated STS traffic through the switch 141 and the pointer processor 134 to the formatting circuit 132. A full twenty-four channels are then transmitted on the line 143 to the optical transmitter 146, and thence out by the "A" transmit fiber 150. Further in this add/drop mode, the "B" formatter 74 takes the "added" STS data from the working interface cards 46 and combines it with regenerated STS signals from the pointer processor 172 at the formatting circuit 180. Twenty-four channels of data may be transmitted to the optical transmitter 186 and formed into a second optical signal on the optical fiber 190. These twenty-four channels may therefore be entirely different from the twenty-four channels existing in the "A" optical fiber 150 for a bandwidth of forty-eight channels. In the event of a failure, no protection measures will be taken in this equipment. That will occur externally using, for example, a cross connect.

On the receive side in non-protected, 48-channel mode, twenty-four channels of information are received by the "A" deformatter 72. Those channels are sent to the first regeneration output 166 for retransmission and are "dropped" on output port 118. In terminal mode, all channels are "dropped" whereas in add/drop mode, the deformatter is operable to "drop" only selected channels. The working interface cards 18 are operated to select data on the "A" bus 82.

The "B" deformatter 76 receives twenty-four channels of information on its formatted data input 192. All channels are directed to the second regeneration output 206 for retransmission in STS protocol. All or selected channels may also be "dropped" and are sent via bus 84 to the "B" input 124 of the working interface cards 46. Thus, up to forty-eight channels of information may be transmitted through the terminal circuit. If a malfunction occurs in the "A" fibers 150 or 152, the non-protected traffic in the "B" fibers is dropped in favor of protecting the "A" traffic, and the "A" traffic rerouted on a span of "B" fibers.

It is also possible to operate the terminal circuit as shown in FIG. 1 in a "one for one (1:1)" configuration as follows. The working interface cards 18 transmit voice and communications data on the STS "A" by 78 to the "A" formatter 70. Voice and communications data are received from the "A" deformatter 72 by the working interface cards 18. The interface cards 46 and the "B" formatter 74 and the "B" deformatter 76 do not carry voice or data communications traffic but instead are available to carry protect channel access traffic. Where there is a malfunction on the "A" fibers 150 or 152 or the various pieces of "A" dedicated equipment, traffic is rerouted to the "B" formatter and deformatter 74 and 76 and a span of "B" fibers 190 and 202 is used.

Terminal circuit 10 operates a "terminal" mode (and also in one of the "1+1", "1:1" or nonprotected modes) by not retransmitting any signal received from the regeneration input and output ports 166, 210, 206 or 216. In this condition, the transmit fibers 150 and 190 transmit voice and data communications originating entirely from the interface cards 18 and/or 46. The interface cards 18 and 46 receive STS data which originates solely from the optical receive fibers 152 and/or 202.

Figure 4:
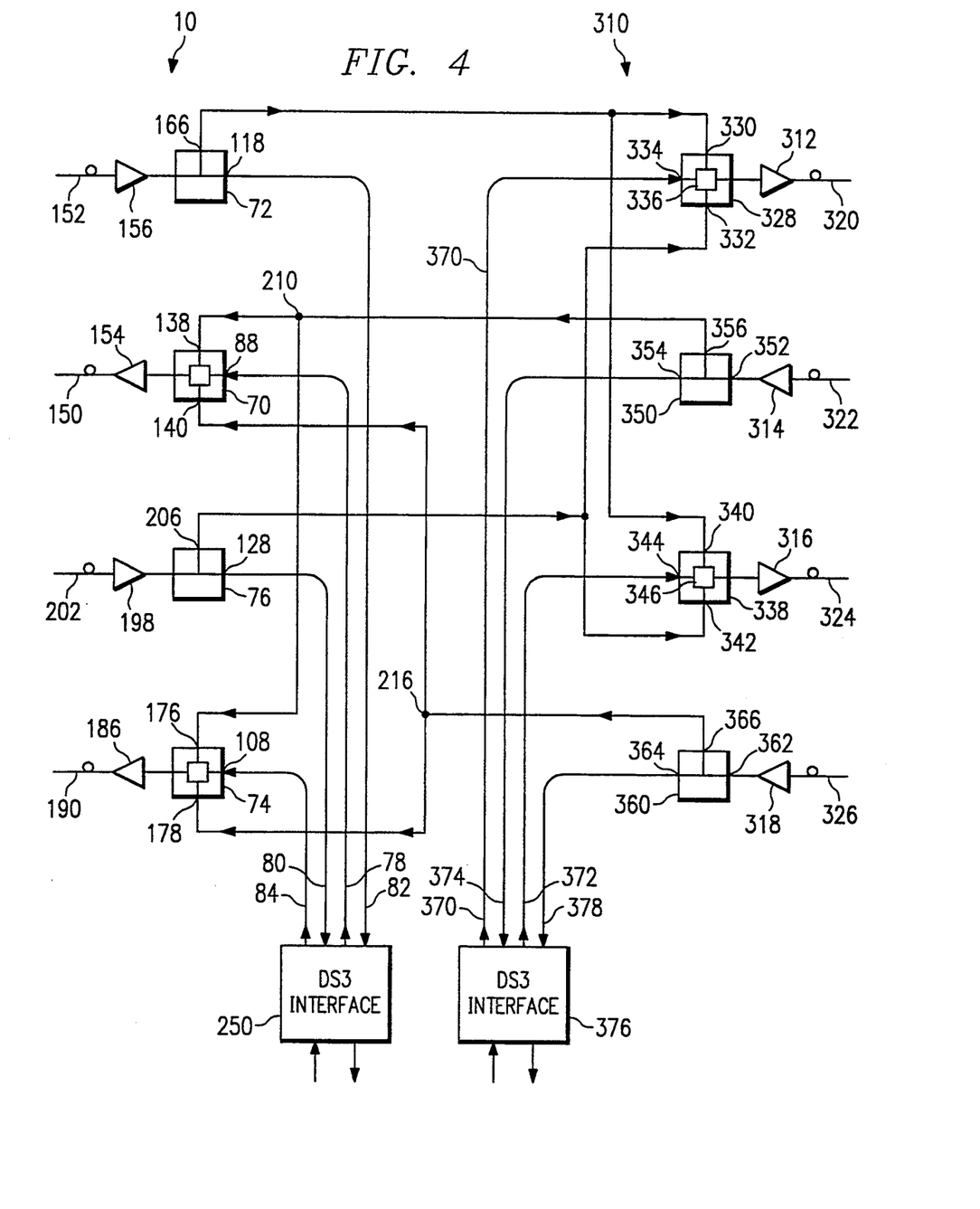
FIG. 4 is a simplified electrical schematic diagram of two terminals configured as an add/drop telecommunications node or as a node of a bidirectional ring according to the invention.

FIG. 4 is a high level schematic diagram showing how a terminal circuit 10 may be connected back-to-back with a similar terminal circuit 310 and used as an add/drop node in a ring network, or as a node in a bidirectional ring network. The second interface circuit is indicated generally at 310, and includes an "A" optical transmitter 312, an "A" optical receiver 314, a "B" optical transmitter 316, and a "B" optical receiver 318. The optical output of the transmitter 312 is connected to an "A" optical fiber 320. The optical input of the optical receiver 314 is connected to an "A" optical fiber 322. The optical output of the optical transmitter 316 is connected to a "B" optical transmit fiber 324. The optical input of the optical receiver 318 is connected to a "B" optical receive fiber 326.

An "A" formatter 328 of the second interface circuit 310 has a first STS regeneration input port 330, a second STS regeneration input port 332, and an STS "add" input port 334. A format circuit 336 is operable to transmit selected channels of input 334 and one of inputs 330 and 332 in a formatted data stream to the input of the optical transmitter 312. A "B" formatter 338 has a first STS regeneration input port 340, a second STS regeneration input port 342 and an STS "add" signal input port 344. A formatting circuit 346 is operable to select channels of the input 344 and one of inputs 340 and 342, and combine them into a formatted signal that is fed to the input of the "B" optical transmitter 316. As in formatters 70 and 74, the formatters 328 and 338 can select only one of the two regeneration input ports that are available to them. For example, the "A" formatter 328 may select channels from regeneration input 330, or regeneration input 332, but not both. The selection capability of "B" formatter 338 is similar.

The optical receiver 314 is provided with an "A" deformatter 350. "A" deformatter 350 is operable to deformat the signals received at its input 352. "Dropped" channels of these STS signals appear at a "dropped" output 354 of the deformatter 350. Traffic is also output in STS protocol on a first regeneration output port 356.

The "B" optical receiver 318 is provided with the "B" deformatter 360, which has a formatted data input 362, a "dropped" STS signal output 364 and a second regeneration output port 366. The "B" deformatter 360 is operable to receive the twenty-four channels of formatted information received at input port 362, deformat them into STS protocol, and transmit them for retransmission in the STS protocol to the regeneration output port 366. "Dropped" STS signals also appear at port 364.

The DS3/STS interface circuitry illustrated in FIG. 1, including cards 18, 26, 34, 46, 52 and 60, are represented by DS3 interface block 250. STS signals are "added" via buses 78 and 80 to "A" formatter 70 and "B" formatter 74 respectively. STS signals are "dropped" from the "A" deformatter 72 and the "B" deformatter 76 through buses 82 and 84, respectively, to the DS3 interface block 250. For interface circuit 310, an "A" bus 370 is provided to "add" STS signal traffic to the "A" formatter 328. A "B" bus 372 is provided to "add" STS signal traffic to the "B" formatter 338. An STS "A" bus 374 transmits "dropped" signals from the "A" deformatter 350 to a DS3 interface block 376. A "B" bus 378 is used to transmit "dropped" STS signal traffic from the "B" deformatter 360 to the DS3 interface block 376.

The configuration illustrated in FIG. 4 provides an important advantage in that traffic may be communicated from so-called east-west fibers 152 and 202 to so-called west-east fibers 320-324 without being dropped down to the DS3 protocol and thence back up to 2.1 Gigabits. Instead, data may stay at the STS protocol to be transmitted through the node, and then sent on its way in optical form on other optical fibers. This is because the regeneration output and input ports of one interface circuit 10 are respectively connected to the regeneration input and output ports of the other interface circuit 310, allowing the direct transmission of STS signals without translation and retranslation.

The first regeneration output port 166 of circuit 10 is connected to the first regeneration input ports 330 and 340 of the interface circuit 310. The second regeneration output port 206 of the first interface circuit 10 is connected to the second regeneration input ports 332 and 342 of the second interface circuit 310. In a similar manner, the first regeneration output port 356 of circuit 310 is connected to the first regeneration input ports 138 and 176 of circuit 10, while the second regeneration output port 366 of the second interface circuit 310 is connected to the second regeneration input ports 140 and 178 of the first interface circuit 10.

At a typical installation, the DS3 interface block 250 will contain less than sixteen working interface cards, although sixteen such cards are illustrated in FIG. 1. A typical number is eight such cards, handling a total of twelve main channels and twelve protect channels on the DS3 side. Similarly, DS3 interface block 376 will typically contain approximately eight interface cards. The number of interface cards is variable according to the DS3 traffic handled at this particular node. Less than sixteen cards are provided in each of the interface blocks 250 and 376 in order to allow sufficient bandwidth for the through-transmission of STS data. There must be sufficient bandwidth to handle both the through traffic and the add/drop traffic.

The present invention has particular application in ring architectures. In the formation of rings, it is desirable for "A" fibers and "B" fibers, such as fibers 152 and 202, to take physically different paths. Thus, fiber 202 will physically depart from the node illustrated in FIG. 4 in a different direction from fiber 152, although they are both shown as "east-west" traffic. This route diversity aids in the physical protection of the circuits from such calamities as line cuts. Because, for example, fibers 152 and 202 travel in different directions, they will be connected to different nodes. The lack of synchronization between the "A" clocks and the "B" clocks allows considerable variance between the frequencies for the ring of which fiber 152 forms a part, as opposed to the ring of which fiber 202 forms a part.

The configuration shown in FIG. 4 also allows protection of particular spans of "A" or "B" fibers. Suppose, for example, that "A" fibers 150 and 152 are physically cut. "A" traffic on fibers 320 and 322 may be shunted through the STS interconnection architecture of the invention to the "B" fibers 190 and 202, effectively circumventing the span of "A" fibers 150 and 152. At the next node, this traffic may be shunted back onto the "A" fibers. Thus, only one span of "A" fibers needs to be taken out of service.

Figure 5:
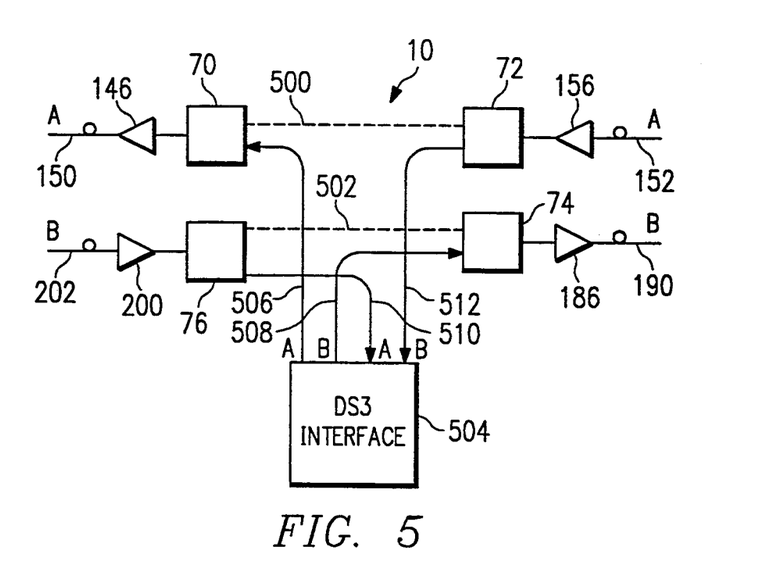
FIG. 5 is a simplified electrical schematic diagram of two terminals configured as a node of a unidirectional ring according to the invention.

FIG. 5 illustrates a terminal circuit 10 which has been configured into a node for a unidirectional ring. In a unidirectional ring, the "A" fibers 152 and 150 are arranged such that data on them flow in a single direction, while data on the "B" fibers 202 and 190 flow in an opposite direction. The regeneration input and output ports are connected such that an STS path 500, shown by a dotted line, connects the "A" deformatter 72 with the "A" formatter 70. A similar STS data path 502 connects the "B" deformatter 76 with the "B" formatter 74. The STS/DS3 interface circuitry, indicated by block 504, is operable to transmit and receive "A" and "B" traffic on buses 506–512.

While the present invention has been described in connection with translation among DS3, STS and optical protocols, it is also useful for any interface circuitry operating to translate signals between at least two such protocols where a first protocol has a nominal frequency which is a fraction of the second protocol. For example, the present invention may have application to interface circuitry receiving or transmitting DS1 and-/or DS2 signals.

In summary, the present invention allows the through-transmission of telecommunications data using the STS protocol without having to be translated down to DS3 format and then back up to STS format, as is conventionally now required. This lack of translation and retranslation improves the signal quality and saves considerable expense in the provision of DS3/STS interface cards. Furthermore the present invention provides DS3/STS interface circuit which can inspect STS data quality without switching to the inspected bus. In addition, the present invention provides "A" and "B" clocks which do not have to be of the same frequencies, thus saving considerable expense in providing closely matching clock generator circuitry. Cross-point matrices are provided to compact STS channels and save usable bandwidth. Back-to-back terminal circuits according to the invention provide add-drop and bidirectional telecommunications interface nodes with excellent high-speed protection.

While preferred embodiments of the invention have been disclosed in the above detailed description, the invention is not limited thereto, but only by the scope and spirit of the appended claims.

What is claimed is:

1. A high speed telecommunications interface protection system, comprising:

at least one interface circuit operable to receive a first signal in a first protocol and in response thereto to transmit a second signal in a second protocol, said interface circuit further operable to receive a third signal in said second protocol and in response thereto to transmit a fourth signal in said first protocol;

a first destination circuit coupled to said interface circuit, said first destination circuit operable to generate a first clock frame and to send said first clock frame to said interface circuit;

a second destination circuit coupled to said interface circuit, said second destination circuit operable to generate a second clock frame and to send said second clock frame to said interface circuit; and said interface circuit operable to transmit said second signal in said second protocol to said first destination circuit by inserting said second signal into said first clock frame to said first destination circuit, said interface circuit further operable to transmit said second signal in said second protocol to said second destination circuit by inserting said second signal into said second clock frame and retransmitting said second clock frame to said second destination circuit.

2. The system of claim 1, wherein said first and second destination circuits comprise formatters for formatting said signals in said second protocol into respective formatted signals, respective optical transmitters coupled to said formatters for receiving respective ones of said formatted signals and transmitting optical signals in response thereto.

3. The system of claim 1, and further comprising first and second source circuits coupled to said interface circuit for transmitting signals in said second protocol to said interface circuit, said first source circuit transmitting said third signal to said interface circuit as inserted into a first clock frame, said second source circuit transmitting said third signal to said interface circuit as inserted into a second clock frame, at least said first clock frame capable of including alarm signals for signalling a malfunction;

said interface circuit normally selecting said third signal from said first source circuit for reception and retransmission in said first protocol, said interface circuit selecting said third signal from said second source circuit in response to sensing an alarm in said clock frame sent from said first source circuit.

4. The system of claim 3, wherein said first and second source circuits comprise a deformatters operable to deformat a formatted signal into a signal in said second protocol, said system further comprising, for each of said deformatters, an optical receiver operable to receive an optical signal and coupled to a respective one of said deformatters for transmitting thereto a formatted signal in response to receiving said optical signal.

5. The system of claim 1, wherein said first protocol is DS3, said second protocol being STS.

6. A method for transmitting signals within a telecommunications interface using at least first and second telecommunications protocols, comprising the steps of:

receiving data in said first communications protocol by at least one interface circuit;

translating said received data by said interface circuit into data in said second communications protocol;

using an "A" clock of an "A" destination circuit, generating an "A" clock frame;

using a "B" clock of a "B" destination circuit, generating a "B" clock frame, the "A" clock and the "B" clock not having to be synchronized;

transmitting from the "A" destination circuit to the interface circuit the "A" clock frame;

transmitting from the "B" destination circuit to the interface circuit the "B" clock frame;

using the "A" clock frame, transmitting the data in said second communications protocol from the interface circuit to said "A" destination circuit; and using the "B" clock frame, transmitting the data in said second communications protocol from the interface circuit to said "B" destination circuit.

7. The method of claim 6, wherein said first communications protocol is DS3 and the second communications protocol is STS.

8. The method of claim 6, wherein said "A" and "B" destination circuits are each coupled to an optical communications fiber, the method further including the step of transmitting an optical signal on each said fiber in response to corresponding ones of said "A" and "B" destination circuits receiving data in said second communications protocol.

* * * * *